(12) United States Patent
Baker

(10) Patent No.: US 6,186,001 B1
(45) Date of Patent: Feb. 13, 2001

(54) SENSOR FOR MEASURING CONTENT LEVELS IN CONTAINERS

(76) Inventor: William J. Baker, P.O. Box 1160, Saskatoon, Saskatchewan (CA), S7K 3N2

(*) Notice: Under 35 U.S.C. 154(b), the term of this patent shall be extended for 0 days.

(21) Appl. No.: 09/336,532

(22) Filed: Jun. 18, 1999

(51) Int. Cl.[7] .............................. G01F 23/26; G01F 23/00; G01F 23/22
(52) U.S. Cl. ..................... 73/304 C; 73/304 R; 73/298; 73/301
(58) Field of Search ................................. 73/304 C, 301, 73/298, 304 R

(56) References Cited

U.S. PATENT DOCUMENTS

| | | | | |
|---|---|---|---|---|
| 4,756,076 | * | 7/1988 | Dyben et al. ........................ 29/621.1 |
| 4,890,492 | * | 1/1990 | Andrejasich et al. ................... 73/292 |
| 5,554,937 | * | 9/1996 | Sanders et al. ....................... 324/664 |

* cited by examiner

Primary Examiner—Hezron Williams
Assistant Examiner—Dennis Loo
(74) Attorney, Agent, or Firm—James C. Eaves, Jr.; Greenebaum Doll & McDonald PLLC

(57) ABSTRACT

A container level sensor is disclosed comprising an elongate strip member for mounting in a container in a generally upright orientation. The strip member has a measurable capacitance that changes as the level of material stored in the container changes. Two insulated conductive strips, held apart by magnetic forces or resilient spacers, can be used to form a capacitor, with the force of material in the container against the sensor pushing the strips together and thereby changing the capacitance. This change can be measured by a circuit.

16 Claims, 2 Drawing Sheets

SECTION A-A

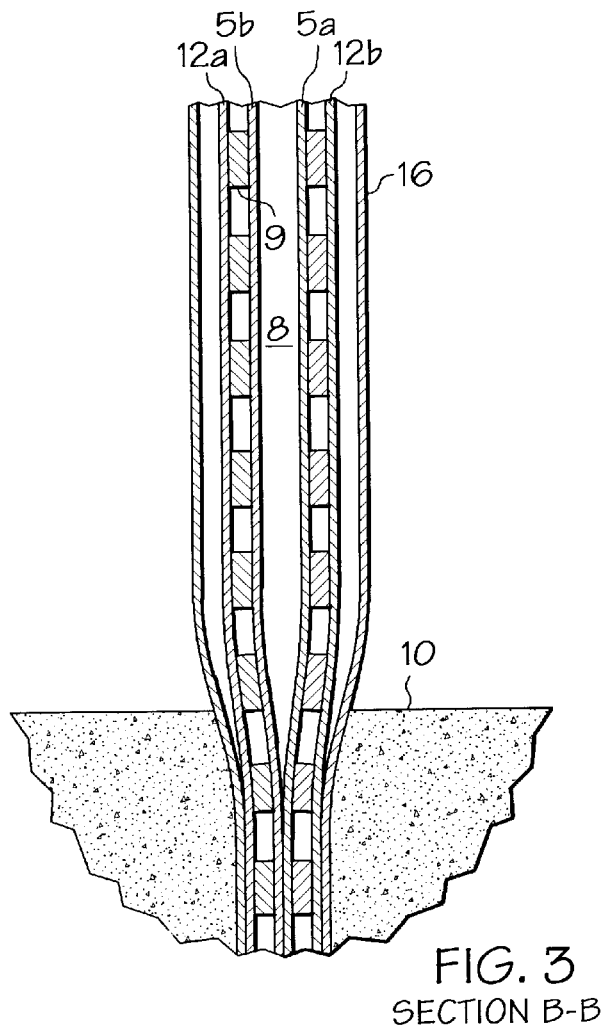
FIG. 3
SECTION B-B
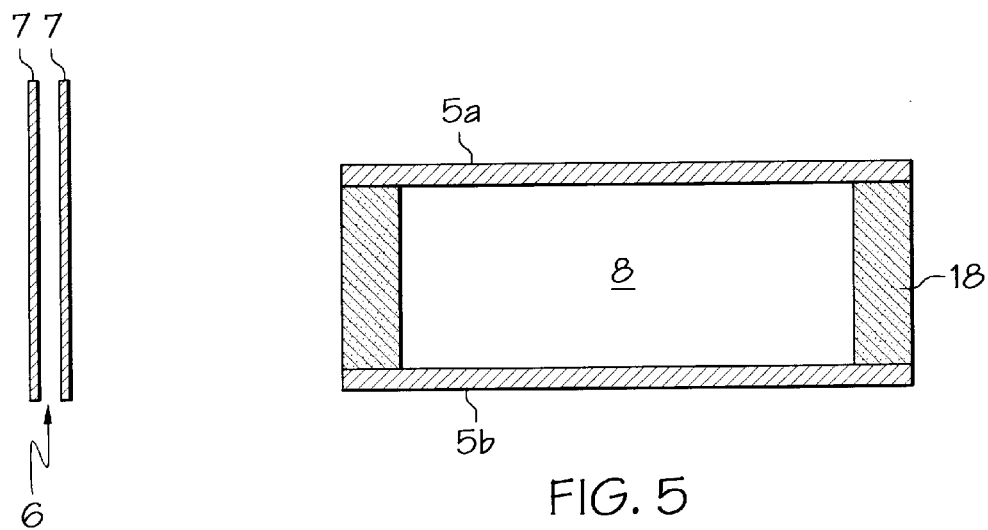
FIG. 4
FIG. 5

SENSOR FOR MEASURING CONTENT LEVELS IN CONTAINERS

This invention is in the field of measuring the content level in containers, such as bins and tanks, and particularly sensors for such measurement.

BACKGROUND

It is often necessary to determine the quantity of liquid stored in a tank or the quantity of granular material, such as grain, stored in a bin. Conventionally this is accomplished by climbing to the top of the container and looking in. Remote sensors are used as well which employ various techniques including photo-electric and ultra-sonic techniques which are costly. Changes in resistance of an element as the container level changes has been measured and correlated to bin level, however foreign material and corrosion can cause changes in resistance of the contact points and so is not dependable. Liquid tanks can also use sight glasses mounted on the tank exterior.

A dependable and economic level sensor which can be mounted on the interior of a liquid or particulate container would be beneficial.

SUMMARY OF THE INVENTION

It is the object of the present invention to provide a sensor for determining the level of material in a container by changing the capacitance thereof in response to the action of the material on the sensor.

It is a further object of the present invention to provide such a sensor that is suitable for use with liquid or particulate material.

The invention accomplishes its objects providing in one aspect a container level sensor comprising an elongate strip member for mounting in a container in a generally upright orientation, said strip member having a measurable capacitance that changes as the level of material stored in said container changes.

In a second aspect the invention provides an apparatus for measuring the level of material in a container comprising a sensor comprising an elongate strip member for mounting in said container in a generally upright orientation, said strip member having a measurable capacitance that changes as the level of material stored in said container changes; and a circuit for detecting the change in capacitance.

As capacitance varies with the proximity of the elements of the capacitor, no physical contact is required. Problems with poor contact are eliminated. Two capacitor elements will have a given capacitance when separated along their entire length, and this capacitance will be reduced as the elements are brought closer together at one end, and will be progressively reduced as the elements are progressively brought closer together along their length. Providing a separating force between flexible elements that is small enough to be overcome by the pressure of material in the container allows a measuring circuit to determine at what point along the length of the strip member the separating forces have been overcome, and therefore determine the level of material in the container. The sensor will work with either liquid or particulate material, as either will exert some force that is greater than the empty space above the material.

The strip member could comprise a first elongate electrically conductive strip insulated from the material and from the container; a second elongate conductive strip insulated from the material, from the container and from the first strip; at least one of the first and second strips being flexible and mounted spaced from the other the strip such that the force of the material on the flexible strip causes the space between the first and second strips to be reduced so as to change the capacitance of the capacitor defined by the first and second strips; and a cover to prevent the material from entering the space between the first and second strips.

The cover could be a flexible membrane between the two strips on each side, or could enclose the two strips entirely. It could be made of any material suitable to prevent the material in the container from entering the space between the strips and thereby preventing the strips from moving toward one another in response to the pressure of the material.

Each of the strips could conveniently comprise a laminate of an electrically conductive foil and an insulating plastics material. The foil could be covered on both sides by the insulating plastic material. The foil material also provides flexible first and second strips, which will flex when subjected to pressure from the material.

Conveniently, the space between the first and second strips could be maintained by opposing field magnets attached along the length of each strip wherein the force of the material on the flexible strip overcomes the magnetic force of the magnets to reduce the space between the strips and thereby reduce the capacitance of the strip member. The uncompressed space can conveniently be defined and maintained by having the cover enclose the two strips thereby preventing the magnetic forces from pushing the strips beyond the desired spacing.

Alternatively the first and second strips could be separated by a pair of resilient spacer members arranged along the edges of the strips leaving an open area between the spacer members. The spacer members could be formed from foam or the like, and could comprise a strip of foam with adhesive on each side for attachment respectively to each of the strips.

Other spacing devices or materials could be used as well, and all such devices and materials are considered to fall within the scope of the invention.

The strip member could be attached to the container wall, as by magnets or mechanical fasteners, or anchored so as to extend from substantially the bottom of the container to the top thereof at a location inside the walls of the container.

For measuring the level of particulate material, the apparatus could further comprise at least a second strip member laterally spaced from the first strip member; and a circuit for detecting the change in capacitance of the second strip member. This would provide level measurements at two locations such that the surface contour of the particulate material in the container can thereby be calculated and the quantity of the particulate material in the container can be closely estimated. Further sensors could be added, allowing for further definition of the surface contour and more accurate estimation of the quantity.

For example in a grain bin, one strip member could be attached to the wall and the other near the centre of the bin. Liquid containers would of course require only one sensor.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

FIG. 3 is a cross-section view along BB in FIG. 2;

FIG. 4 is a detail view of the construction of the laminated foil strips;

FIG. 5 is a schematic cross-section of a sensor using foam to separate the strips.

DETAILED DESCRIPTION OF THE ILLUSTRATED EMBODIMENTS

Figure 1:
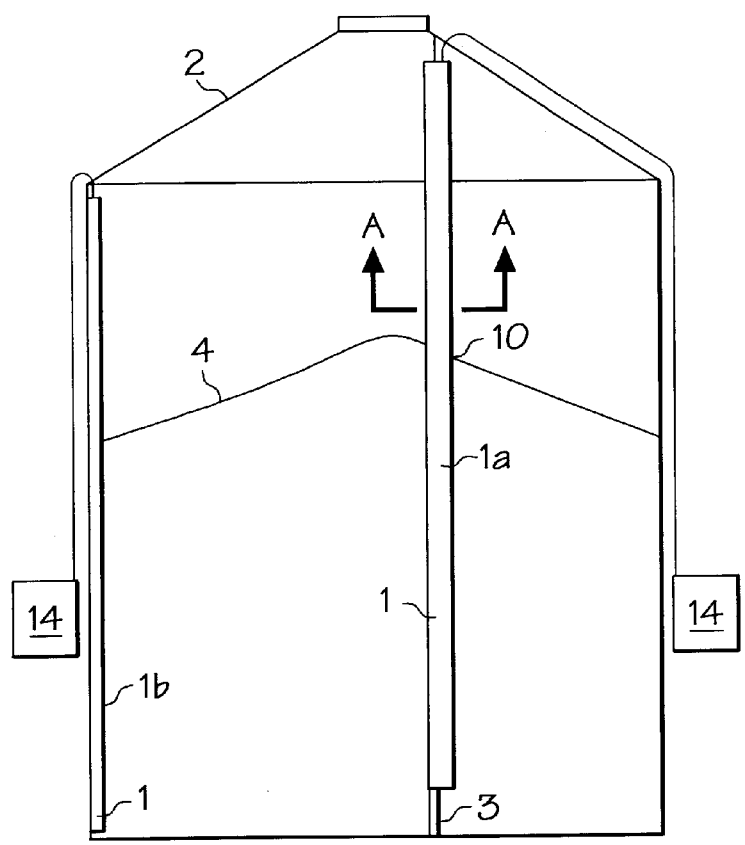
FIG. 1 is a schematic side view of two sensors mounted in grain bin partially filled with grain.
Figure 2:
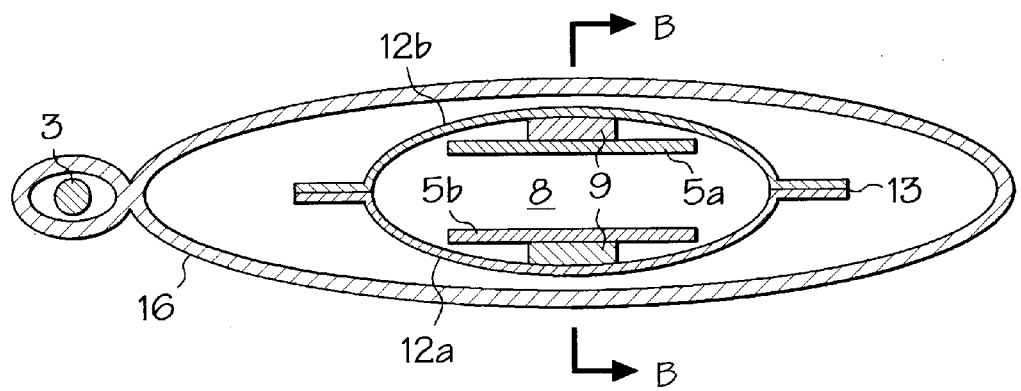
FIG. 2 is a cross-section view along AA in FIG. 1.

FIG. 1 illustrates a grain bin 2 with two sensors 1 of the invention mounted therein. Interior sensor 1a is mounted in the bin interior anchored by a cable 3 extending along the edge thereof as illustrated in FIG. 2. The cable 3 is anchored at the top and bottom of the bin 2, and may be located at any desired location. The attachment of the cable 3 on one edge of the sensor 1a allows the sensor 1a to pivot as the grain 4 contacts it so that the narrowest profile of the sensor 1a meets the grain 4, thereby reducing stress on the cable 3.

Wall sensor 1b is mounted on the bin wall by adhesive, magnets, screws or any conventional means. The sensors 1 are elongate strip members and are mounted in a generally upright orientation. The strip members have a measurable capacitance that changes as the level of material stored in said container changes as will be illustrated.

FIG. 2 illustrates a cross-section of the sensor 1a along line AA in FIG. 1. Elongate electrically conductive strips 5a and 5b make up the capacitor of the invention. The capacitance of this capacitor is related to the space between the strips 5a and 5b. In operation a portion of the length of the strips 5a and 5b above the grain level 10 will be separated and that portion that is below the material level 10 will be pushed together as illustrated in FIG. 3. The total capacitance of the sensor will vary depending on the relative length of the separated and pushed together portions. That portion that is separated will have a large capacitance while that portion that is pushed together will have a very much smaller capacitance, since the distance between the two strips 5a, 5b will then only be two thicknesses of plastic material 7. Each strip 5a, 5b is connected to a circuit 14 for detecting the change in capacitance.

The strips 5a and 5b each comprise a laminate of an electrically conductive foil 6 and an insulating plastics material 7. The foil 6 is covered on both sides and edges by the insulating plastic material 7 as illustrated in FIG. 4. The thin foil 6 of the strips 5a and 5b allows both strips to flex in response to force exerted by the grain 4 in the bin 2.

The space 8 between the strips 5a and 5b is maintained by a plurality of opposing field magnets 9 which are glued to the strips 5a and 5b. Cover 12 is made up of front and back covers 12a and 12b which are glued to the opposite side of the magnets 9. The front and back covers 12a, 12b are then glued together along seam 13 to form the sealed cover 12. The cover acts to prevent grain 4 from entering the space 8 between the two strips 5a, 5b. The cover also serves to restrain the strips 5a, 5b as the magnetic force of the magnets 9 pushes them apart.

As illustrated in FIG. 3 the force of the grain 4 on the strips 5a, 5b overcomes the magnetic force of the magnets 9 to push the strips 5a, 5b together and reduce the space 8 and thus reduce the capacitance of the sensor 1, which change is measured in the circuit 14. Similar forces would be exerted by a liquid material in a container. At the top of a liquid, the pressure may not be enough to overcome the force of the magnets 9 however the force increases with the depth of liquid and so some compensation could be built in to determine the actual liquid level which would be somewhat higher than that point where the strips 5a, 5b are pushed together.

In order to protect the sensor 1, a fabric sock 16 is pulled over the sensor 1, which sock also serves to hold the sensor 1 to the cable 3.

The cross-section of the wall sensor 1b is essentially the same, however may have some varying accommodation for attachment to the wall, such as ties on the sock 16 or so forth.

An alternate sensor is schematically illustrated in FIG. 5. The strips 5a, 5b are held apart by resilient foam spacer members 18 which compress in response to the force of the grain 4, thereby changing the space 8 and thus the capacitance. The foam spacer members 18 have adhesive on each side for attachment respectively to each of the strips 5a, 5b. In this configuration the foam spacer members 18 also serve as a cover by keeping the grain from entering the space 8.

Having two laterally spaced sensors, such as the interior sensor 1a and wall sensor 1b, allows the surface contour of the particulate material in the container to be calculated and the quantity of grain 4 in the bin to be closely estimated. Grain bins may be unloaded from a side hatch or from the centre, and two or more properly located sensors can indicate whether the bin has been partially unloaded, thus leaving a sloped cavity in the bin, or has been partially filled, thus leaving an upward cone in the centre. A larger number of sensors can be used where further accuracy is desired.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

I claim:

1. A container level sensor for mounting in a container in a generally upright orientation to sense the level of material in said container, said sensor comprising an elongate strip member having a measurable capacitance, said strip member comprising:

a. a first elongate electrically conductive strip insulated from said material and from said container;

b. a second elongate conductive strip insulated from said material, from said container and from said first strip;

c. at least one of said first and second strips being flexible and mounted spaced from the other said strip such that the force of said material on the flexible strip causes the space between said first and second strips to be reduced so as to change the capacitance of the capacitor defined by said first and second strips; and d. a cover to prevent said material from entering said space between said first and second strips.

2. The sensor of claim 1 wherein each of said strips comprises a laminate of an electrically conductive foil and an insulating plastics material.

3. The sensor of claim 2 wherein said foil is covered on both sides and both edges by said insulating plastic material.

4. The sensor of claim 3 wherein both said first and second strips are flexible.

5. The sensor of claim 1 wherein said space between said first and second strips is maintained by opposing field magnets wherein the force of the material on said flexible strip overcomes the magnetic force of said magnets to reduce said space and thereby reduce the capacitance of said strip member.

6. The sensor of claim 4 wherein said space between said first and second strips is maintained by opposing field magnets wherein the force of the material on said flexible strip overcomes the magnetic force of said magnets to reduce said space and thereby reduce the capacitance of said strip member.

7. The sensor of claim 6 wherein said strip member is attached to the container wall.

8. The sensor of claim 6 wherein said strip member is anchored so as to extend from substantially the bottom of said container to the top thereof at a location inside the walls of said container.

9. The sensor of claim 1 wherein said first and second strips are separated by a pair of resilient spacer members arranged along the edges of said strips leaving an open area between said spacer members.

10. The sensor of claim 9 wherein said spacer members are formed from foam.

11. The sensor of claim 9 wherein said spacer members each comprise a strip of foam with adhesive on each side for attachment respectively to each of said strips.

12. The sensor of claim 9 wherein said strip member is attached to the container wall.

13. The sensor of claim 9 wherein said strip member is anchored so as to extend from substantially the bottom of said container to the top thereof at a location inside the walls of said container.

14. An apparatus for measuring the level of material in a container comprising:
 a. a container level sensor for mounting in a container in a generally upright orientation to sense the level of material in said container, said sensor comprising an elongate strip member having a measurable capacitance comprising:
  1. a first elongate electrically conductive strip insulated from said material and from said container;
  2. a second elongate conductive strip insulated from said material, from said container and from said first strip;
  3. at least one of said first and second strips being flexible and mounted spaced from the other said strip such that the force of said material on the flexible strip causes the space between said first and second strips to be reduced so as to change the capacitance of the capacitor defined by said first and second strips; and
  4. a cover to prevent said material from entering said space between said first and second strips; and
 b. a circuit for detecting the change in capacitance.

15. The apparatus of claim 14 wherein said space between said first and second strips is maintained by opposing field magnets wherein the force of the material on said flexible strip overcomes the magnetic force of said magnets to reduce said space and thereby reduce the capacitance of said strip member.

16. The apparatus of claim 14 wherein said first and second strips are separated by a pair of resilient spacer members arranged along the edges of said strips leaving an open area between said spacer members.

* * * * *